United States Patent
Mamorsky

(10) Patent No.: US 7,072,895 B2
(45) Date of Patent: Jul. 4, 2006

(54) AUDIT SYSTEM AND METHOD

(75) Inventor: Jeffrey Mamorsky, Greenwich, CT (US)

(73) Assignee: Fiduciary Audit Services Trust, New York, NY (US)

( * ) Notice: Subject to any disclaimer, the term of this patent is extended or adjusted under 35 U.S.C. 154(b) by 0 days.

(21) Appl. No.: 10/466,831

(22) PCT Filed: Oct. 12, 2001

(86) PCT No.: PCT/US01/42765

§ 371 (c)(1), (2), (4) Date: Feb. 22, 2005

(87) PCT Pub. No.: WO02/31707

PCT Pub. Date: Apr. 18, 2002

(65) Prior Publication Data

US 2005/0131784 A1    Jun. 16, 2005

Related U.S. Application Data

(60) Provisional application No. 60/240,215, filed on Oct. 13, 2000.

(51) Int. Cl.
*G06F 17/30* (2006.01)

(52) U.S. Cl. ............... 707/10; 707/6; 707/101; 707/102; 707/103 R; 707/104.1; 707/201

(58) Field of Classification Search ......... 707/10, 707/1, 6, 101, 102, 103 R, 104.1; 705/38; 709/224; 717/168; 126/22

See application file for complete search history.

(56) References Cited

U.S. PATENT DOCUMENTS

| | | | | |
|---|---|---|---|---|
| 5,495,607 A | * | 2/1996 | Pisello et al. | 707/10 |
| 6,056,786 A | * | 5/2000 | Rivera et al. | 717/168 |
| 6,134,664 A | * | 10/2000 | Walker | 726/22 |
| 6,289,332 B1 | * | 9/2001 | Menig et al. | 707/1 |
| 6,643,625 B1 | * | 11/2003 | Acosta et al. | 705/38 |
| 2002/0026507 A1 | * | 2/2002 | Sears et al. | 709/224 |
| 2004/0148192 A1 | * | 7/2004 | Morley et al. | 705/1 |

OTHER PUBLICATIONS

Stonebraker, "The Integration of Rule Systems and Database Systems", IEEE, 1992, pp. 415-423.*
Ilgun et al., State Transition Analysis: A Rule-Based Intrusion Detection Approach, IEEE, 1995, pp. 181-199.*
Mukherjee et al., "Network Intrusion Detection", IEEE, 1994, pp. 26-41.*

* cited by examiner

*Primary Examiner*—Thuy N. Pardo
(74) *Attorney, Agent, or Firm*—Adam B. Landa; Richard E. Kurtz, II; Greenberg Traurig, LLP

(57) ABSTRACT

The invention provides a system and method for reducing and potentially eliminating the review of source documents by auditors to determine whether there is compliance of an audited subject area with a predetermined set of rules. The inventive system and method provides one or more questions directed to personnel that are familiar with the subject area being audited. It may be accompanied by cross-checking question and/or verification of the responses. The responses and cross-checks or verifications, if any, are compared for consistency and rule compliance. Where non-compliance is determined to exist, or where there is a question whether non-compliance exists, an audit alert is generated. This may be followed by evaluating the audit alert through a review of source documents, thereby eliminating the need for a review of source documents unless an audit alert is determined to exist, and limiting the review of source documents to documents relevant to the audit alert.

13 Claims, No Drawings

AUDIT SYSTEM AND METHOD

CROSS REFERENCE TO RELATED APPLICATION

This application claims priority from U.S. Provisional Application No. 60/240,215, filed Oct. 13, 2000, which is herein incorporated by reference in its entirety.

FIELD OF THE INVENTION

The present invention relates to an audit system and method, and more particularly to a system and method for performing an audit without the need for review or spot-check of the source documents.

BACKGROUND OF THE INVENTION

In 1974, Congress enacted a law, the Employee Retirement Income Security Act (ERISA) which contains fiduciary rules, employee protection provisions and amendments to the Internal Revenue Code (IRC) that require employee benefit plan sponsors (employers or trustees in the case of multi-employer plans) to operate employee benefit plans in accordance with their terms and in accordance with the law. Failure to do so can result in personal liability through litigation or governmental action or the imposition of monetary sanctions on plan sponsors in the case of operational or plan document violations-relating to retirement plans.

In order to avoid liability, the IRS and Department of Labor ("DOL") have established programs that require plan sponsors to establish a self-audit compliance process that identifies and corrects operational and plan document violations prior to an audit by IRS or DOL. The evaluation of compliance with ERISA and the IRC is accomplished through an investigation of documents and personnel records that normally involve a review of: (i) employee benefit plans, trusts, summary plan description brochures, administrative manuals, employee communications and other related documents; (ii) annual financial returns filed on behalf of employee benefit plans; (iii) personnel records which reflect the extent of compliance with procedures relating to employee enrollment, participation, vesting, change in employment status, contributions and benefit accrual, joint and survivor payment and notice requirements for married employees, proper calculation and payment of benefits and a myriad of other legal and regulatory requirements; and (iv) compliance with IRS requirements that prohibit discriminations in favor of highly compensated employees with respect to contributions and/or benefits provided by the employee benefit plan. This review is primarily conducted on-site at the location of the documents and personnel records across the country.

The accomplishment of such a review of operational and plan document compliance is a Herculean task that involves a myriad of professional disciplines including legal, accounting/auditing, actuarial/consulting, plan administration, investment management, communications, and other services. It is also very costly and time-consuming. This is further exacerbated by the expense and administrative burden of an on-site review.

As a result, plan sponsor employers and trustees of multi-employer plans are reluctant to perform such a compliance review even though it is required by ERISA and IRS policy and procedures. There is a need for a system and method that identifies areas of noncompliance on a cost-efficient basis.

SUMMARY OF THE INVENTION

Accordingly, it is an object of the present invention to provide an audit system and method that mitigates the need for review of source documents and personnel records.

It is another object of the present invention to provide a system and method for the analysis of responses to questions in order to ascertain whether a plan sponsor has adequate procedures in place to comply with the requirements of the law, regulations or other requirements.

It is yet another object of the invention to permit the identification of operational and plan document noncompliance without the need for an on-site document review and audit.

DESCRIPTION OF PREFERRED EMBODIMENTS

The present invention is a system and method for providing audit capability without the need to review source documents. In one embodiment, the system and method may be applied to ERISA compliance, and used to: (i) assist plan sponsors (employers and, in the case of multi-employer plans, trustees) and prototype plan sponsors (a business entity that provides employee benefit plan documents to employers and trustees who use their plan administration and/or investment management services) in monitoring the operation of their employee benefit plans (employer-provided benefits including retirement, health, disability, dependent care and cafeteria plans) in a manner that is consistent with the requirements of the Employee Retirement Income Security Act of 1974 (ERISA) and the Internal Revenue Code (IRC), (ii) identify areas of noncompliance with ERISA and the IRC and (iii) be cost-efficient by eliminating the need for review of most source documents in an on-site investigation.

In one embodiment, the inventive system and method consists of three main parts: (i) an investigative audit questionnaire which is designed to ascertain whether the audited subject area is administered in compliance with a set of rules; (ii) a comparison of the responses to the questionnaire with the plan documents to ascertain whether there are any apparent areas of noncompliance; and (iii) the preparation of an audit report which describes any areas of noncompliance that are identified by the audit.

In a preferred embodiment, the inventive system and method may consist of: (i) an investigative questionnaire designed to ascertain how an ERISA plan is administered through a series of easy to respond to questions on each aspect of plan administration and legal compliance; (ii) an analysis of the completed questionnaire and comparison to the plan documents to ascertain whether the operation and administration of the plan is being carried out in conformity with the plan documents; and (iii) the preparation of an annual fiduciary audit report which describes any areas of noncompliance that are identified by the analysis.

The questionnaire may be delivered in a traditional paper format, or through a computer based system technology. In a preferred embodiment, the entire audit, including the presentation of a questionnaire, the gathering of responses to the questionnaire that reflect the administration of the plan in comparison with the plan documents, the analysis of the responses, and the preparation of a non-compliance report, may be conducted without on-site review of most source documents.

Exemplary ERISA Audit

In an exemplary embodiment of the present invention, a questionnaire is provided that contains a series of questions, the questions being based on each aspect of an ERISA plan document and its administration and legal compliance.

The questionnaire is completed by the target of the audit and its agents. Many of the questions may be responded to by the plan administrator or other professional advisor, although some questions should be completed only by the employer or trustee plan sponsor. Any particular question from the questionnaire should be responded to by personnel having first hand knowledge of the correct response to the question, and preferably, by the person with the most-knowledge with respect to the subject matter of the question.

In a preferred embodiment, the employer/trustee will be required to verify the accuracy of at least some of the responses of others, such as, for example, the plan administrator. In one embodiment, verification may be obtained by placing a checkmark in a box that is placed next to each question. For example, the plan administrator is asked to complete the question: "How many hours of service are required to receive a year of vesting credit?" The employer/trustee is then required to review the plan administrator's response to that question and verify that the response is correct in light of how the employer/trustee is administering the plan by placing a checkmark in the box located directly below the question. Alternatively, in another embodiment, two different people—such as, for example, the plan administrator and the employer/trustee—may be asked the same question, and the verification results from consistency between the two responses. It is also contemplated that, within a single audit, for the questions that are verified, some questions will be verified by a review and check-mark procedure, while other questions may be verified by asking the same question to two different people and comparing the responses.

Although any question may be asked, in a preferred questionnaire, most questions require only that the respondent check a "yes" or "no" box or elect one or more of the available responses. Thus, a response to a given question may preferably be provided by checking one or more boxes provided for the response to that question. Some questions may require a short written response, e.g., 1,000 hours or age 21. Some questions may require a descriptive response, particularly if a response to a question is in the nature of a selection of "Other" for a multiple choice type question. In the latter case, a longer descriptive answer is usually required to be provided by the respondent.

The responses to the questionnaire are used to identify areas of noncompliance, if any, using a variety of methods to verify the accuracy of the response (as described above and further described below) and to verify compliance or noncompliance with a plan, as further described below. As will be apparent to a person of ordinary skill in the art, the questionnaire is preferably designed in such a way as to permit ready identification of the areas of noncompliance.

One method of determining areas of noncompliance comprises identifying responses that are not verified. This could result where the employer/trustee is unable to verify that the plan administrator's response to a question is correct. Similarly, it could result from the employer/trustee and the plan administrator providing different responses to the same question. See item 3A below which illustrates an exemplary employer/trustee verification process.

A second method of determining areas of noncompliance comprises the comparison of the response to one question with the response to another question. In this situation, various questions are tied (i.e., related) to one or more other questions so that a response to one question can be verified by the response to one or more other questions. If responses to such related questions are inconsistent, the inconsistencies are identified as possible areas of noncompliance. As an example, the question may be provided: "Does the plan require a specific number of hours an employee must complete before becoming a participant?" If the plan administrator responds "yes", the number of hours must also be provided. Another question may ask for the same information in a different manner. That question provides "How many hours of service are required to become a participant?" The plan administrator must provide a numerical response. If, for example, the plan administrator indicates that the plan does not have control procedures in place to determine the number of hours of service earned by a participant, or the plan administrator describes a procedure that is inadequate to determine a participant's hours of service, an area of noncompliance may be identified. In other words, if the response to the first question is not consistent with the response to the second question, an area of noncompliance may be identified.

A third method of determining areas of noncompliance comprises flagging of responses such as "other", "none" or a noncompliant response. In other words, many of the questions may provide a response which allows the respondent to choose a response that would be, at least initially, identified as an area of noncompliance. For example, where the respondent selects "Other" because none of the available options contained in the questionnaire adequately describe plan administration, the "other" response may be treated initially as an area of noncompliance until it is analyzed and evaluated by a reviewer. An evaluation may be necessary because the "other" selection is preferably accompanied by a written response that may show compliance. Similarly, where a "none" selection is made that evidences that there are no plan provisions or procedures with respect to the compliance area illustrated by the question, this would preferably be treated as an area of noncompliance, at least until it is further evaluated. Moreover, some questions may provide a response which is known as a noncompliant response. In such a case, the selection of that response may be treated as an area of noncompliance.

To illustrate, a question may provide: "Has the plan established procedures to determine when employees have met the Plan's participation and vesting requirements?

[ ] Yes, payroll records are reviewed periodically in accordance with the plan's entry dates to verify a participant's hours of service.

[ ] Other (Description of the plan's procedures) _____.

[ ] No, there are no procedures for determining when an employee has met the participation requirements.

If the "No" response is selected, an area of noncompliance will be identified. If the "Other" response is selected, an area of noncompliance will be identified and the descriptive response will be evaluated to determine if compliance is adequate. Reference to item 3C below may be had, which illustrates some circumstances under which a response will be evaluated.

In addition to the above-described methodology contained in the questionnaire, the inventive method and apparatus will enable the performance of other tasks that may make it easier to identify areas of noncompliance. For example:

1. It will be possible to identify questions that frequently generate areas of noncompliance.

2. It will also be possible to identify questions that frequently generate an area of noncompliance in the audit report but upon further evaluation are determined not to be an area of noncompliance.

3. It will also enable the comparison of responses contained in the questionnaire with the basic terms of the plan document, other pertinent information contained in employee communications and annual returns filed on behalf of the plan by creating questions that will elicit such information for each plan, or making an entry into an automated system for implementing the inventive method that reflects such information.

In a preferred, computerized implementation of the inventive method, the automated system would have the capacity to perform items 1 and 2 above on a system-wide basis or on behalf of a subset of questionnaires, such as for each prototype plan sponsor.

Illustrations of the Process

A. Employer/Trustee Verification of Plan Administrator's Response

If the employer/trustee indicates that the plan's administrative procedure is different from the plan administrator's response by checking the "Not Correct" box, an area of noncompliance will be identified. For example:

Question: How many hours of service are required to receive a year of vesting credit? _____

Employer/Trustee verification:
☐ Correct ☐ Not Correct

B. Consistent Response Required Between Related Questions

The following two questions are related since both questions relate to procedures for identifying rehired employees who are eligible to participate in the plan. The responses to both questions must be consistent. For example:

Question: Has the plan established procedures to ascertain whether new or rehired employees who have met the plan's eligibility requirements are included in the plan on a timely basis (e.g., comparison of payroll data to list of new participants; verification of hours through payroll records)?
Yes ☐ No ☐ is preferably related to:

Question: Has the plan established procedures to determine whether the employee has had prior employment with an affiliated employer ("affiliated employment") or previously terminated under the plan (e.g., review by the Plan Administrator of personnel records which are transferred when an employee is transferred to another affiliate)?
Yes ☐ No ☐

The question below is related to the next eight questions since all of the questions relate to the plan's age and service requirements for either becoming a participant or receiving vesting credit. Responses to all of these questions must be consistent. Any inconsistency will result in an area of noncompliance being identified. For example:

Question: Has the plan established procedures to determine when employees have met the plan's participation and vesting requirements (e.g., verification of hours of service and age requirement through review of payroll records)?
Yes ☐ No ☐ is related to all of the following questions:

Question: Does the plan require a specific number of hours an employee must complete before becoming a participant?
Yes ☐ No ☐
If so, how many? ☐☐☐☐☐

Question: Is a record of hours worked by employees maintained to establish membership?
Yes ☐ No ☐

Question: Are participants credited for periods of time during which no duties are performed and for which the employee is paid (e.g., vacation, holiday, illness, disability, jury duty, military duty or leave of absence) in order to satisfy the hours of service requirements?
Yes ☐ No ☐

Question: From what age is an employee's service counted to:
a. become a participant ☐☐.☐☐
b. receive a year of vesting credit ☐☐.☐☐

Question: How many months of service are required to:
a. become a participant ☐☐.☐☐
b. receive a year of vesting credit ☐☐.☐☐

Question: How many hours of service are required to:
a. become a participant ☐☐.☐☐
b. receive a year of vesting credit ☐☐.☐☐

Question: For participation and vesting purposes, is service counted on:
☐ Plan year basis
or
☐ The anniversary of an employee's initial employment date Question: If eligibility service is counted on a plan year basis rather than from the anniversary date of an employee's initial employment date, is an employee who meets the plan's eligibility requirements on both his/her anniversary date and the end of the first plan year credited with 2 years of service for purposes of eligibility to participate?
Yes ☐ No ☐

C. Evaluation of Written Response or "No" Response

Question: Has the plan established procedures to determine when employees have met the plan's participation and vesting requirements?
☐ Yes, payroll records are reviewed periodically in accordance with the plan's entry dates to verify a participant's hours of service.
☐ Other (Description of plan's procedures)
☐ No, there are no procedures for determining when an employee has met the participation requirements.

Employee/Trustee verification:
☐ Correct ☐ Incorrect

Where an "Other" response is selected, the description provided by the respondent in connection with the "Other" response will be evaluated to determine if compliance is adequate. Where "No" is selected, an area of noncompliance will be identified.

While the foregoing describes and illustrates the preferred embodiment of the present invention and suggests certain modifications thereto, those of ordinary skill in the art will recognize that still further changes and modifications may be made therein without departing from the spirit and scope of the invention. Accordingly, the above description should be construed as illustrative and not in a limiting sense, the scope of the invention being defined by the following claims.

I claim:

1. A method for auditing a subject area, the audit being adapted to ascertain whether the audited subject area is being administered in compliance with a set of rules without the need to review source documents, the methods comprising the steps of:
   a) identifying an element of the set of rules that is relevant to the subject area to be audited;
   b) creating a first question designed to elicit an answer relevant to the subject area to be audited;
   c) obtaining a response to the first question from a first person;
   d) obtaining a verification of the response to the first question from a second person; and
   e) flagging an audit alert if the response to the first question reveals tat the audited subject area is not being administered in compliance with the set of rules;
   f) flagging the audit alert if the verification of the response to the first question is negative; and
   g) if the audit alert has been flagged, providing notice of the flagged audit alert.

2. The method claimed in claim 1, wherein the step of obtaining a response to the first question comprises:
   a) electronically delivering the first question to the first person; and
   b) electronically receiving the response to the first question from the first person.

3. A method for auditing a subject area, the audit being adapted to provide notification of an audit alert if audited subject area is not being administered in compliance with a set of rules, the audit being conducted without review source documents, the methods comprising the steps of:
   a) identifying an element of the set of rules that is relevant to the subject area to be audited;
   b) creating a first multiple-choice question having a first response;
   c) creating a second multiple-choice question having a second response, the second response being adapted such tat the selection of the second response to the second multiple-choice question and the selection of the first response to the first multiple-choice question would reveal that the audited subject area is not being administered in compliance with the set of rules;
   d) obtaining a response to the first question;
   e) obtaining a response to the second question;
   f) providing notification of an audit alert if the response obtained to the first question is the first response and the response obtained to the second question is the second response.

4. The method claimed in claim 3, wherein the step of obtaining a response to the first question comprises:
   a) electronically delivering the first question to a first person; and
   b) electronically receiving the response to a first question from the first person.

5. The method claimed in claim 4, wherein the step of obtaining a response to the second question comprises:
   a) electronically delivering the second question to the first person; and
   b) electronically receiving the response to the second question from the first person.

6. The method claimed in claim 4, wherein the step of obtaining a response to the second question comprises:
   a) electronically delivering the second question to a second person; and
   b) electronically receiving the response to the second question from a second person.

7. A method of performing an audit to determine non-compliance with a set of rules without the need for review of source documents, the method comprising the steps of:
   a) creating a first and a second audit question;
   b) determining a logical relationship between at least one response to the first audit question and at least one response to the second audit question, the logical relationship being adapted to reflect the existence of non-compliance with the set of rules;
   c) obtaining responses to each of the first and second audit questions;
   d) determining whether an audit alert exists due to the satisfaction of the logical relationship between the at least one response to the first audit question and the at least one response to the second audit question; and
   e) providing a report of the audit alert determined to exist.

8. The method claimed in claim 7, wherein the step of obtaining a response to each of the first and second audit questions comprises the steps of:
   a) electronically delivering the first question to a first person;
   b) obtaining a response to the first question from the first person;
   c) electronically delivering the second question to a second person; and
   d) obtaining a response from the second person to the second question.

9. The method claimed in claim 7, wherein the step of obtaining a response to each of the first and second audit questions comprises the steps of:
   a) electronically delivering the first question to a first person;
   b) obtaining a response to the first question from the first person;
   c) electronically delivering the second question to the first person; and
   d) obtaining a response to the second question from the first person.

10. A method of performing an audit to determine non-compliance with a set of rules without the need for review of source documents, the method comprising the steps of:
    a) creating a first and a second audit question;
    b) determining a logical relationship between at least one response to the first audit question and at least one response to the second audit question, the logical relationship being adapted to reflect the existence of an internal inconsistency between one of the at least one response to the first audit question and one of the at least one response to the second audit question;
    c) obtaining responses to each of the first and second audit questions;
    d) generating an audit alert in the event that the responses to the first and second audit questions reflect the existence of an internal inconsistency; and
    e) providing a report of the generated audit alert.

11. The method claimed in claim 10, wherein the step of obtaining a response to each of the first and second audit questions comprises the steps of:
    a) electronically delivering the first question to a first person;
    b) obtaining a response to the first question from the first person;
    c) electronically delivering the second question to a second person; and
    d) obtaining a response to the second question from the second person.

12. The method claimed in claim 10, wherein the step of obtaining a response to each of the first and second audit questions comprises the steps of:
   a) electronically delivering the first question to a first person;
   b) obtaining a response to the first question from the first person;
   c) electronically delivering the second question to the first person; and
   d) obtaining a response to the second question from the first person.

13. A method of performing an audit to determine non-compliance with a set of rules the method comprising the steps of:
   a) creating a first and a second audit question;
   b) determining a logical relationship between a first audit question and a second audit question, the logical relationship being adapted to reflect the existence of non-compliance with the set of rules;
   c) obtaining a response to each of the first and second audit questions;
   d) determining whether an audit alert exists due to the satisfaction of the logical relationship between at least the first answer and the second answer;
   e) providing a report of the audit alert determined to exist; and
   f) evaluating the audit alert by a review of source documents, thereby eliminating the need for a review of source documents unless an audit alert is determined to exist, and limiting the review of source documents to documents relevant to the audit alert.

* * * * *